Patented Oct. 16, 1951

2,571,325

UNITED STATES PATENT OFFICE 2,571,325

N-(β-HYDROXYETHYL)-3,4,5-TRIHY-
DROXYBENZOIC ACID AMIDE

Margaret Rose Zentner, Newark, N. J., and Gerhard Julius Haas, New York, N. Y., assignors to Hoffmann-La Roche Inc., Roche Park, Nutley, N. J., a corporation of New Jersey No Drawing. Application January 31, 1950,
Serial No. 141,582

1 Claim. (Cl. 260—559)

This invention relates to N-(β-hydroxyethyl)-3,4,5-trihydroxybenzoic acid amide, which may be also designated as N-(β-hydroxyethyl)-gallic acid amide, and to the method of preparing the same. The new compound is useful in pharmaceutical preparations and more particularly for solubilizing riboflavin. It can also be employed as an intermediate for the preparation of other compounds. In general, the N-(β-hydroxyethyl)-3,4,5-trihydroxybenzoic acid amide can be prepared by reacting a lower alkyl ester of gallic acid, as, for example, the methyl ester of gallic acid with monoethanolamine, the latter reagent preferably being employed in excess.

The following example will serve to illustrate the method of preparing the new compound.

Example 50 grams of methyl gallate and 40.8 grams of monoethanolamine were heated together at 115–120° C. for 8 hours. The solid product which formed was dissolved in 1,300 cc. of boiling water and the solution was adjusted to pH 3–5 with 35 cc. of 36% hydrochloric acid. 2.5 grams of activated charcoal were added and after maintaining the temperature at the boiling point for 10 minutes, the solution was filtered and concentrated to 310 cc. in vacuo. Upon cooling the concentrate and allowing it to stand for 16 hours at about 4° C., crystals of N-(β-hydroxyethyl)-3,4,5-trihydroxybenzoic acid amide, M. P. 217.5–218.8° C., were obtained. The product was recrystallized once by dissolving the crystals in boiling water and cooling the resulting solution. Upon further purification by refluxing the recrystallized material for one hour with acetone so as to remove acetone soluble impurities, there was obtained N-(β-hydroxyethyl)-3,4,5-trihydroxybenzoic acid amide, M. P. 219–220.5° C.

We claim:

N - (β - hydroxyethyl)-3,4,5-trihydroxybenzoic acid amide.

MARGARET ROSE ZENTNER.
GERHARD JULIUS HAAS.

REFERENCES CITED

The following references are of record in the file of this patent:

UNITED STATES PATENTS

| Number | Name | Date |
|---|---|---|
| 2,463,461 | Hoffer | Mar. 1, 1949 |